United States Patent [19]

Sheen

[11] Patent Number: 4,787,241

[45] Date of Patent: Nov. 29, 1988

[54] FLOW TEST STAND AND FLUID SUPPLY SYSTEM

[76] Inventor: Guang-Yue Sheen, No. 1-2, 23 Lane, Yung-Chang Third Street, Taichung, Taiwan

[21] Appl. No.: 10,816

[22] Filed: Feb. 4, 1987

[51] Int. Cl.⁴ .............................................. G01M 3/00
[52] U.S. Cl. ..................................................... 73/45.1
[58] Field of Search .................. 73/41, 45, 45.1, 45.2; 198/345, 339.1

[56] References Cited

U.S. PATENT DOCUMENTS

| | | | |
|---|---|---|---|
| 3,461,716 | 8/1969 | Thomson | 73/45.1 |
| 3,938,532 | 2/1976 | Babunovic | 198/345 X |
| 4,061,014 | 12/1977 | Bott et al. | 73/45.1 |

Primary Examiner—Stewart J. Levy
Assistant Examiner—Joseph W. Roskos
Attorney, Agent, or Firm—Bacon & Thomas

[57] ABSTRACT

A flow test stand system comprising a plurality of like test table units arranged in a head-to-tail manner to form an endless test-unit-chain to enable testing work to be carried out by only three operators in a minimum amount of time.

3 Claims, 5 Drawing Sheets

FLOW TEST STAND AND FLUID SUPPLY SYSTEM

This invention relates to an improved flow test stand system and its corresponding fluid supply system. Currently available flow test stands suffer from the common disadvantage that they necessitate a lot of waiting time during the testing procedure, therefore causing considerable waste of labor and time.

According to the present invention, a plurality of like test table units are provided and connected one by one to form an endless test unit chain. The test unit chain is intermittently driven. Each time it shifts the distance of a test table. Practically, the performance of this system requires only three operators, a first operator at the front end of the endless test unit chain, a second operator at the middle, and a third operator at the rear end thereof. The first operator mounts the flow apparatus which are to be tested respectively onto one test table unit. The second operator carries out the test of each flow apparatus, and marks out the unqualified products. The third operator sorts out the good and bad products and sends them respectively to packing line or repairing line.

According to another feature of this invention, there is provided a fluid supply system which ensures the pressure in each test table unit to the equal.

This invention will be better understood when read in connection with the accompanying drawing, in which:

DETAILED DESCRIPTION OF THE PREFERRED EMBODIMENT

Figure 1:
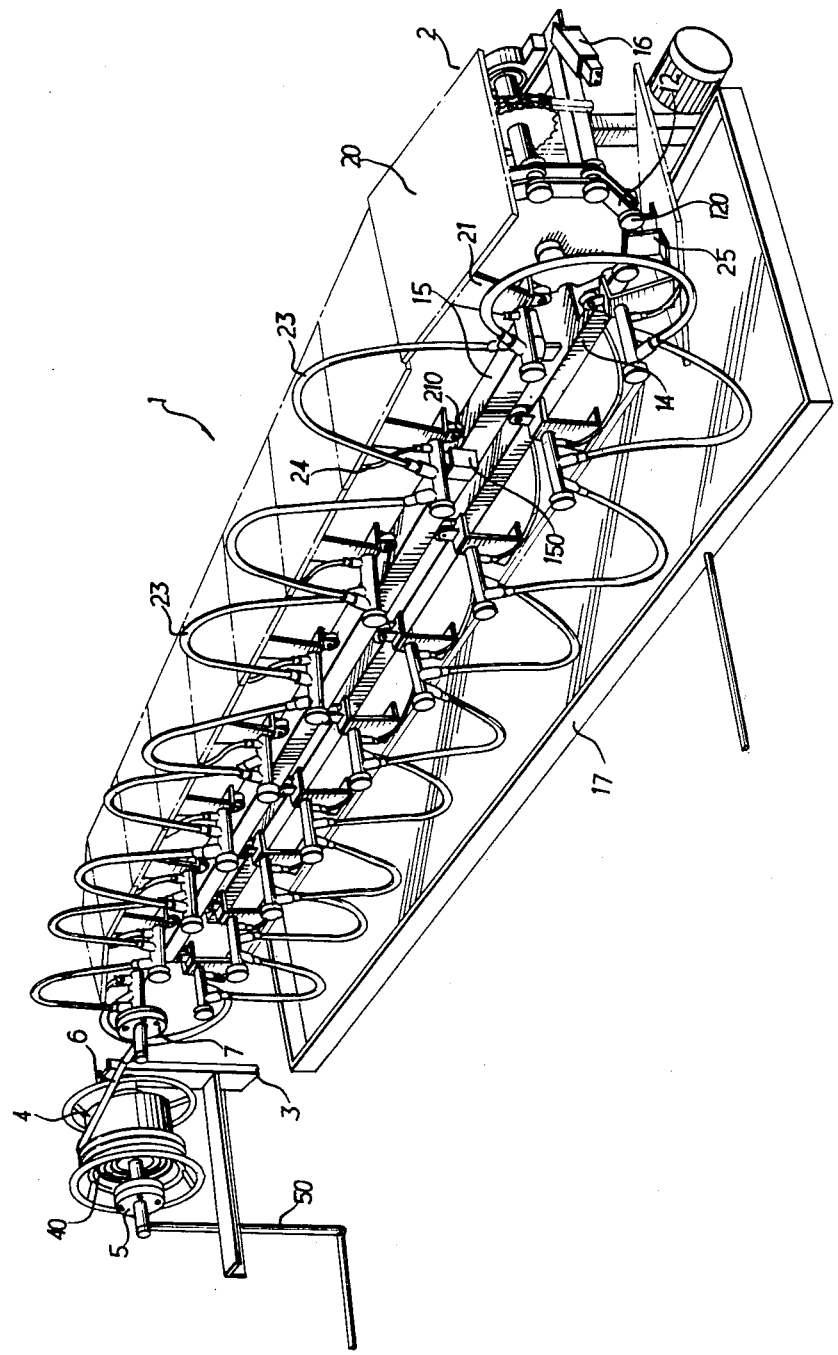
FIG. 1 is a perspective view of the flow test stand system according to this invention with fluid supply system.

Referring to the drawing, particularly FIG. 1 thereof, the main body 1 of the present invention comprises a plurality of test table units 2 connected one by one to form a caterpillar-track-like endless test unit chain. Each test table unit 2 has a flat table plane 20. The table plane 20 can be designed depending on the test requirement. This is similar to known flow test stand and not an essential part of this invention, thus detailed description thereof will be omitted.

The test table units 2 are mechanically connected with an endless chain 12 engaging with two sprockets 10, 11 (see FIG. 2), so that the test table units 2 can be driven. The intermittent driving is achieved by a microswitch 150 which is actuated by a fitting 22 provided on each test table unit 2 to cause the system to stop its motion for a predetermined interval. During this inverval, the first operator can mount a new flow apparatus to the next test table unit 2, and the second operator and the third operator may carry out their respective tasks, too. After this interval the system starts in motion and the endless test unit chain is driven the distance of a test table unit until the microswitch 150 is actuated again. And the work cycle is repeated as before.

Figure 2:
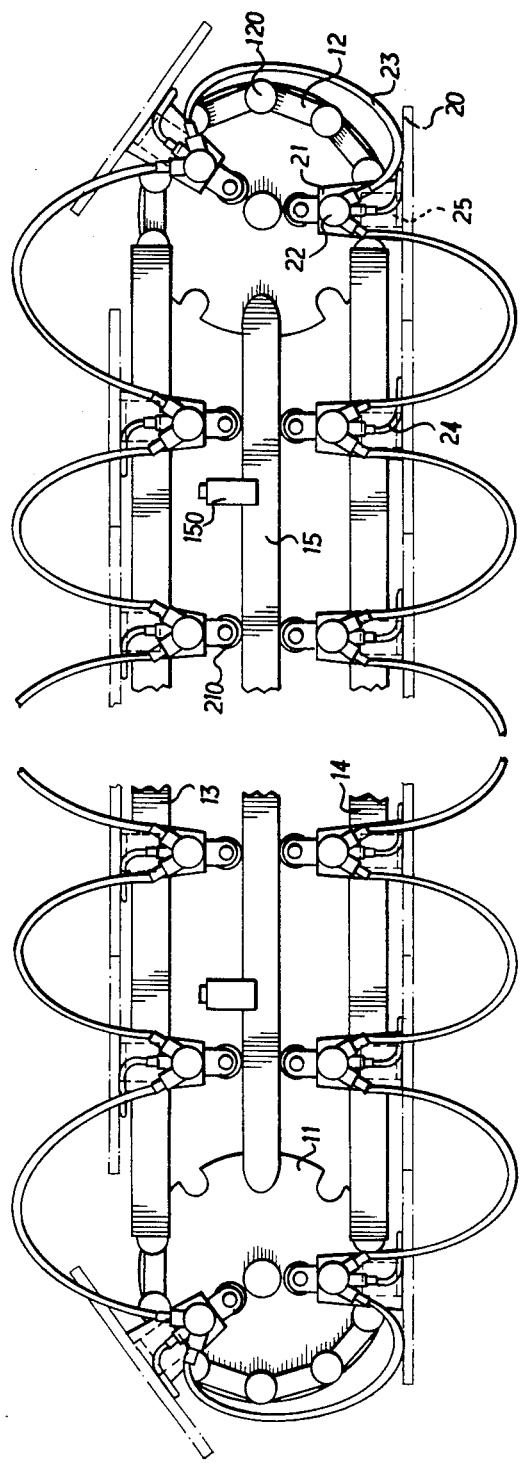
FIG. 2 is a lateral elevational view showing the endless test unit chain and the pipeline of the present invention.
Figure 3:
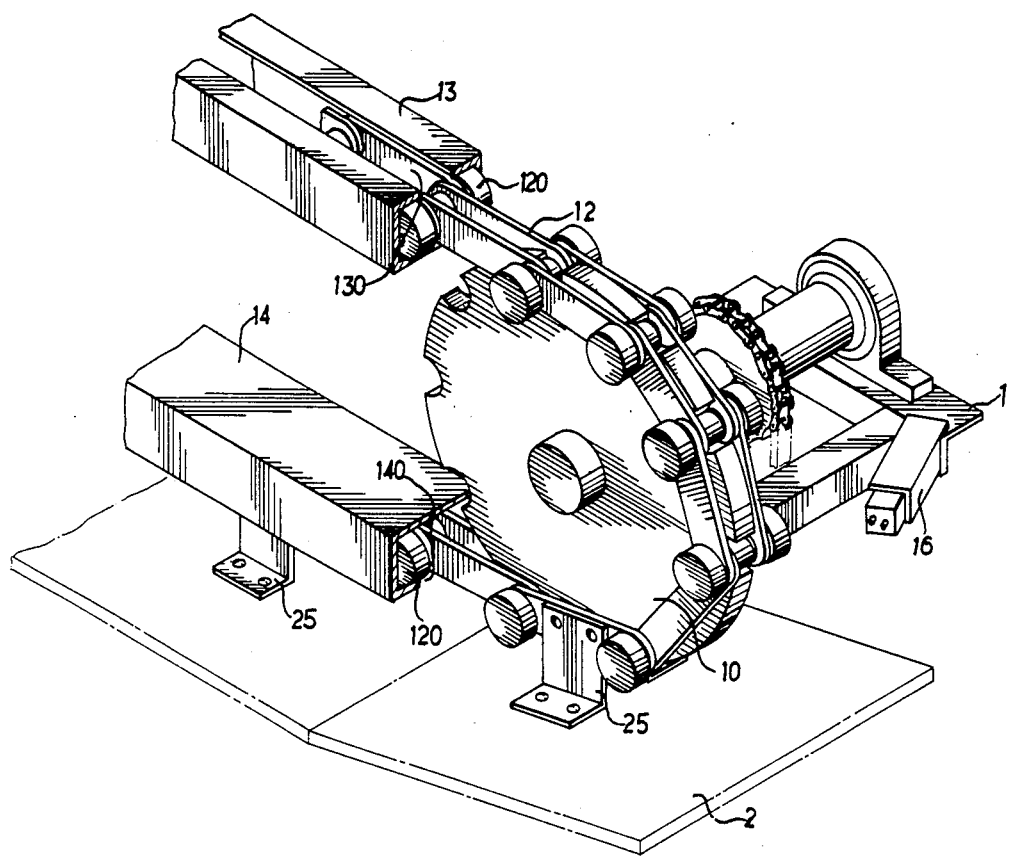
FIG. 3 is an enlarged perspective view showing the mechanical connection of the endless test unit chain.

Now, let's go into the details of the mechanical connection between the test table unit 2 and the chain 12, and the support of the endless test unit chain. Referring to FIG. 3, there is provided a fixing member 25, the ends of which are respectively fixed to one side of a test table unit 2 and the middle part of a segment of chain 12, hence the test table unit 2 (and therefore the whole endless test unit chain) can be driven by sprockets 10 and 11. Referring to FIGS. 1 and 2, the endless test unit chain is driven to travel around an elongated rail 15. Each test table unit 2 has a roller 210 with which it is supported on the rail 15 and guided therealong. The roller 210 is provided on the free end of an arm 21 fixed on one side of the test table unit 2 (see FIG. 4). The chain is guided in an upper profile 13 and a lower profile 14. Both profiles 13 and 14 have C-shaped cross sections and therefore respectively define a slot 130 and 140 extending throughout their length, so as to allow the fixing member to be guided therein. The two ends of the pivot pin of each segment of chain 12 are respectively provided with a roll 120, so that the chain 12 can be smoothly guided in profiles 13 and 14.

Figure 4:
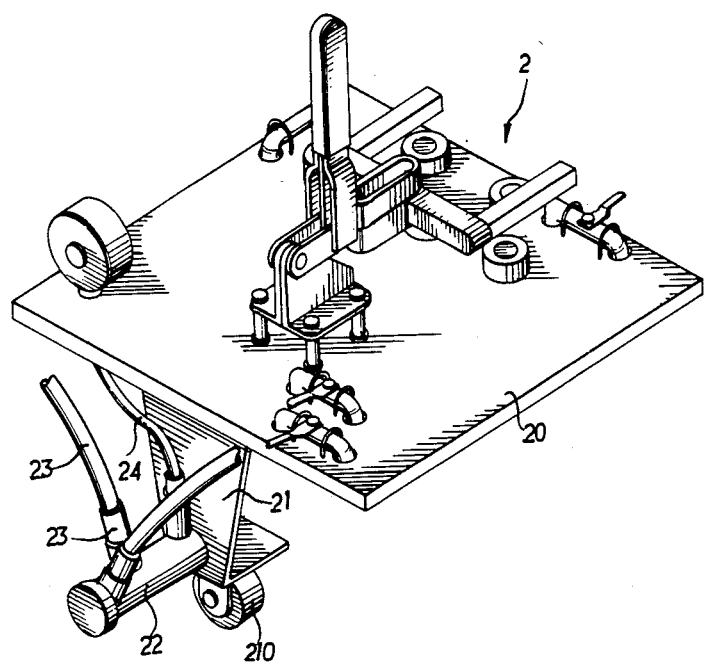
FIG. 4 is an enlarged perspective view of a test table unit.

Finally, let's go to the details of the fluid supply system. Referring to FIG. 4, each test table unit has a fitting 22 fixed near the free end of arm 21. Two pipes 23, which serve respectively as the inlet pipe and outlet pipe are connected to fitting 22. Besides the two pipes 23, the fitting has a thin pipe 24 to communicate with the flow apparatus to be tested (not shown). The water from supply source flows into fitting 22 through the inlet pipe 23 and leaves from outlet pipe 23. Part of the water is supplied to the flow apparatus to be tested.

Figure 5:
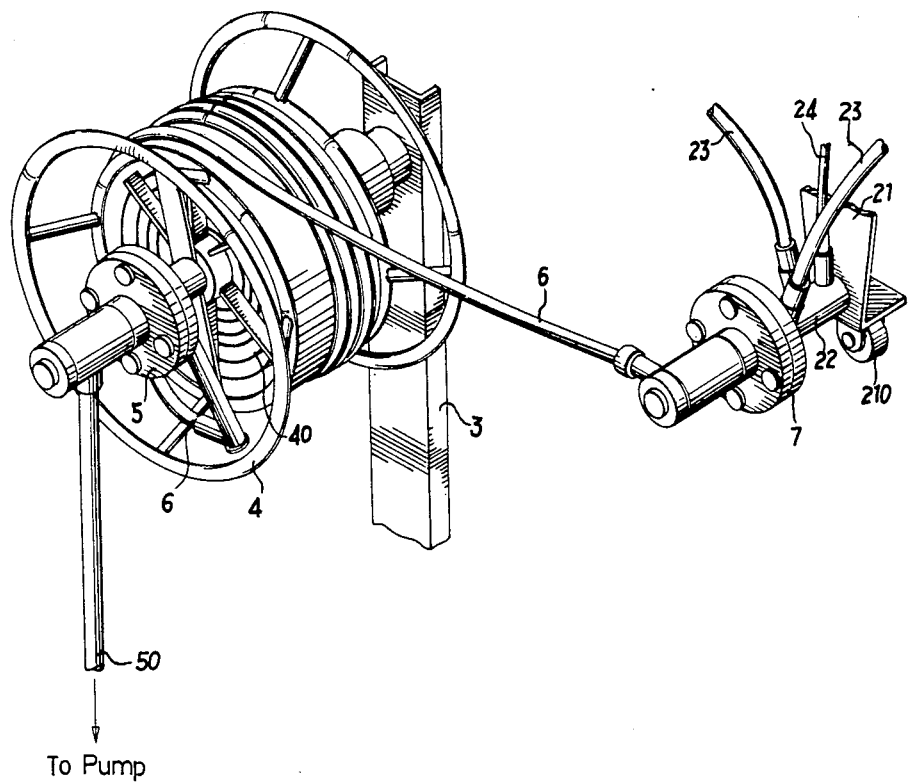
FIG. 5 is a perspective view showing the fluid supply system of this invention.

Referring to FIG. 5, water is supplied from a pump through a pipe 50 and joint 5 into a main hose 6 which is wound into a roll around a drum 4 and connected to a joint 7 which is connected to the fitting 22 of one of the test table units 2. Water flows through pipe 50, joint 5, hose 6, and joint 7 to the fitting 22 and then flows through the pipes 23 from one fitting to another to travel through all the fittings (and therefore supply all the test table units). The very test table unit shown in FIG. 5 to which the hose 6 is directly connected may travel away from and then travel back toward the drum 4 during the operation of this system, the drum is provided with spiral spring 40 which is wound up when the hose 6 is pulled away. Thus when the very test table unit shown in FIG. 5 travels back toward the drum 4, the excessive length of hose 6 will be wound up automatically by the restoring force of the spiral spring 40. Since the piping at joints 5 and 7 is rotatably and sealingly connected, there is no risk of tangling up of the hose 6. Practically the drum 4 is rotatably supported on a drum support 3. Below the endless test unit chain there is provided a water collector 17 to collect the overflowing water during the test. To avoid the negligence of the third operator to dismount the already tested product from a test table unit 2, there is provided a photo-electronic detecting device 16 downstream of the third operator to check if there is still anything left on the test table plane 20. Practically, the microswitch 150 is mounted on the rail 15 in a manner so that it can be touched and actuated by the advancing fitting 22 of test table unit 2.

I claim:

1. A flow test stand system comprising:

(a) a plurality of like test tube units arranged in a head-to-tail manner to form an endless test-unit-chain;
(b) means for driving said endless test unit chain;
(c) control means including a microswitch for controlling said driving means to drive said endless test-unit-chain to alternately travel a distance corresponding to a test table unit and thereafter stop said driving means for a predetermined interval upon actuation of the microswitch;
(d) fluid supplying means for introducing a fluid from a source and distributing said fluid to each test table unit; and
(e) each test table unit including a fitting to provide communication between said fluid supplying means and a flow apparatus to be tested, each fitting being connected with the fittings of two adjacent test table units.

2. The flow test stand system of claim 1 further including a hose connecting the fitting of one test table unit with the fluid source.

3. The flow test stand system of claim 2 further including a drum, the hose being wound around the drum and the drum being provided with restoring means for exerting tension on the hose to wind said hose around said drum.

* * * * *